(12) United States Patent
Lansac et al.

(10) Patent No.: US 6,517,095 B1
(45) Date of Patent: Feb. 11, 2003

(54) SUSPENDED FRONT FORK FOR MOUNTAIN BIKE AND MOTORCYCLE

(76) Inventors: Hervè Lansac, 1 rue des Platanes, 69300 Caluire (FR); Franck Allard Latour, 3 place de l'Eglise, 69570 Dardilly (FR)

( * ) Notice: Subject to any disclaimer, the term of this patent is extended or adjusted under 35 U.S.C. 154(b) by 0 days.

(21) Appl. No.: 09/601,394
(22) PCT Filed: Jan. 29, 1999
(86) PCT No.: PCT/FR99/00191
  § 371 (c)(1),
  (2), (4) Date: Sep. 28, 2000
(87) PCT Pub. No.: WO99/38760
  PCT Pub. Date: Aug. 5, 1999

(30) Foreign Application Priority Data
  Jan. 30, 1998 (FR) .............................. 98 01319

(51) Int. Cl.⁷ .............................................. B62K 25/24
(52) U.S. Cl. ...................................... 280/276; 280/279
(58) Field of Search ................... 280/276, 277, 280/279, 275, 283

(56) References Cited

U.S. PATENT DOCUMENTS

| | | | | |
|---|---|---|---|---|
| 913,961 A | * | 3/1909 | Levedahl | |
| 4,212,481 A | * | 7/1980 | Ribi | 280/276 |
| 6,036,211 A | * | 3/2000 | Nohr | 280/276 |
| 6,152,472 A | * | 11/2000 | Woodside | 280/277 |

FOREIGN PATENT DOCUMENTS

| | | | | |
|---|---|---|---|---|
| DE | 19635939 A1 | * | 12/1997 | |
| FR | 1064265 | * | 5/1954 | 280/276 |
| GB | 13530 | * | 6/1908 | 280/276 |
| GB | 238069 | * | 8/1925 | 280/276 |
| GB | 1540824 | * | 2/1979 | 280/277 |
| GB | 2038736 | * | 7/1980 | |
| WO | 97/46443 | * | 12/1997 | |

* cited by examiner

Primary Examiner—Anne Marie Boehler
(74) Attorney, Agent, or Firm—Cantor Colburn LLP

(57) ABSTRACT

The invention concerns a fork comprising at least one arm at the lower end whereof is mounted the wheel axle and the upper end whereof is associated with a steering pivot. In said fork, on the steering pivot and at the front thereof is fixed a rigid frame comprising at least one vertical flange used for mounting two mutually offset horizontal axles, for articulating the ends of two upper and lower links, whereof the other ends are articulated on each arm of the fork in the upper third of the length thereof, with one end fixed on the rigid frame and its other end fixed to one of the two upper and lower links.

7 Claims, 10 Drawing Sheets

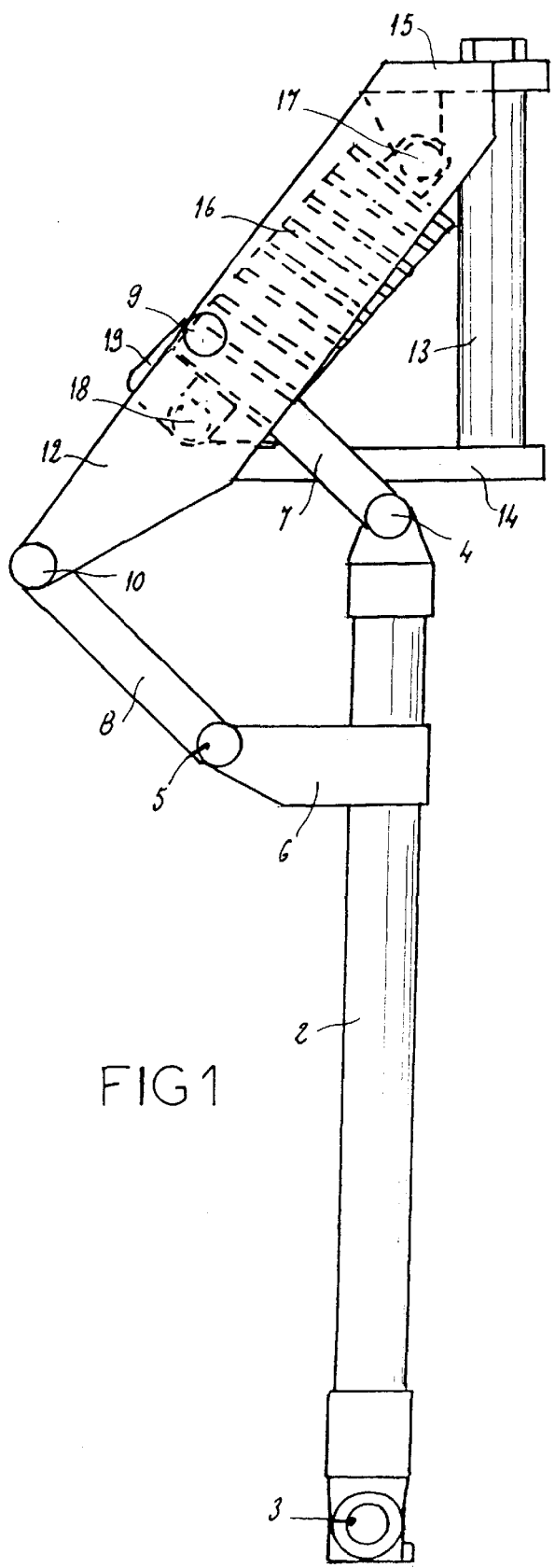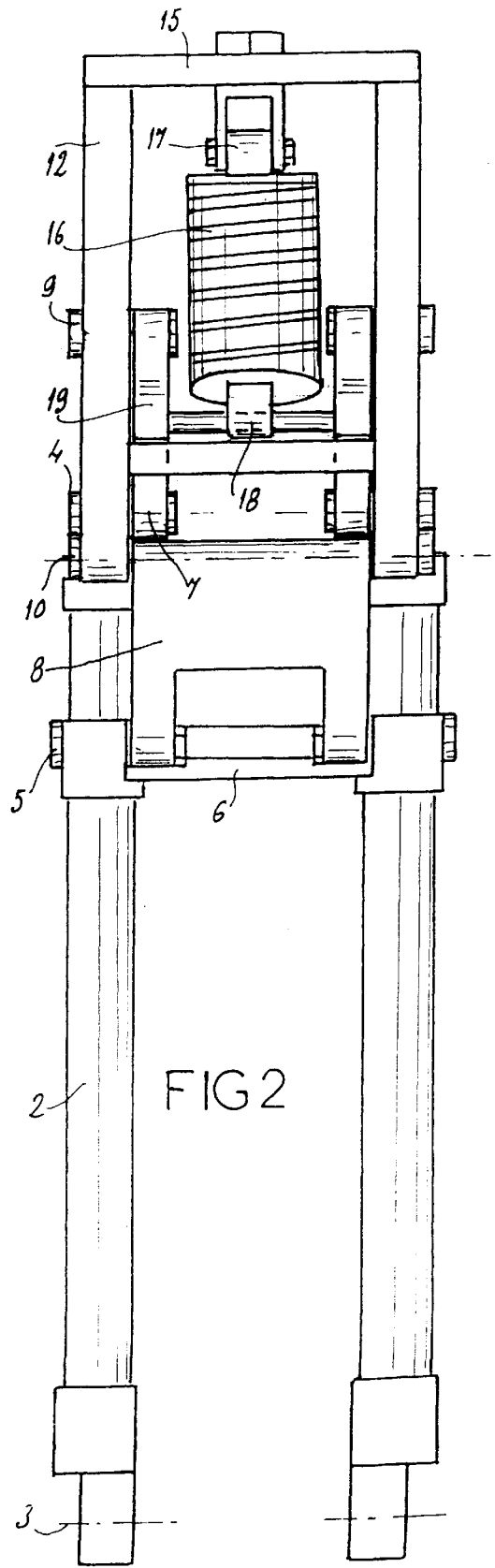
FIG 1
FIG 2

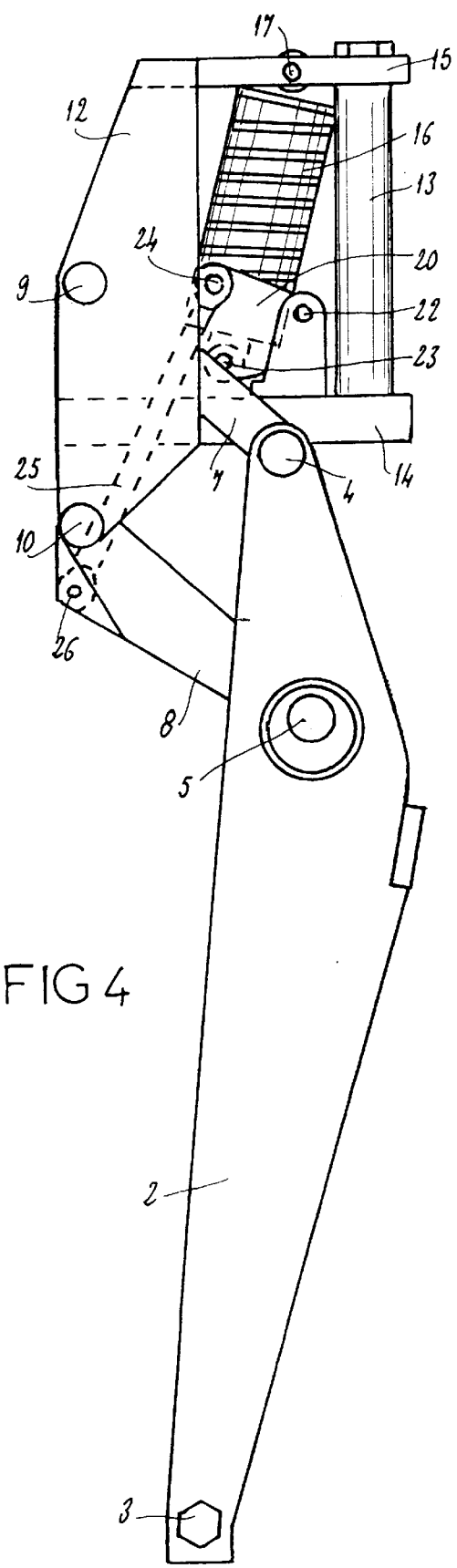
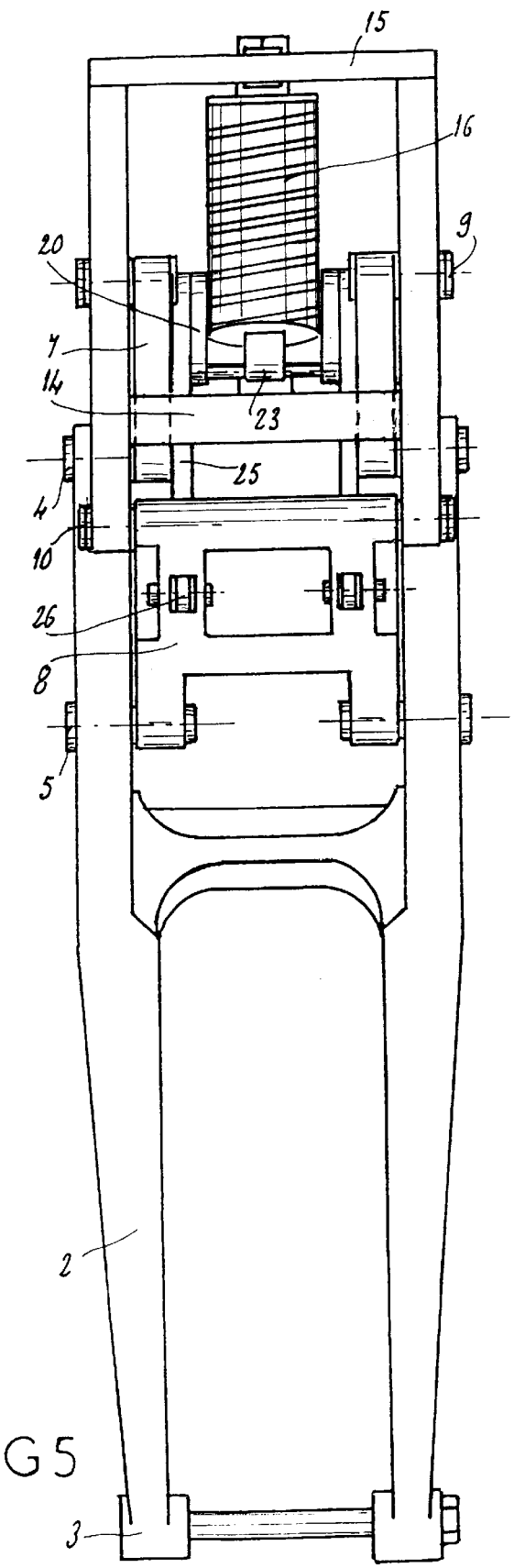
FIG 4
FIG 5

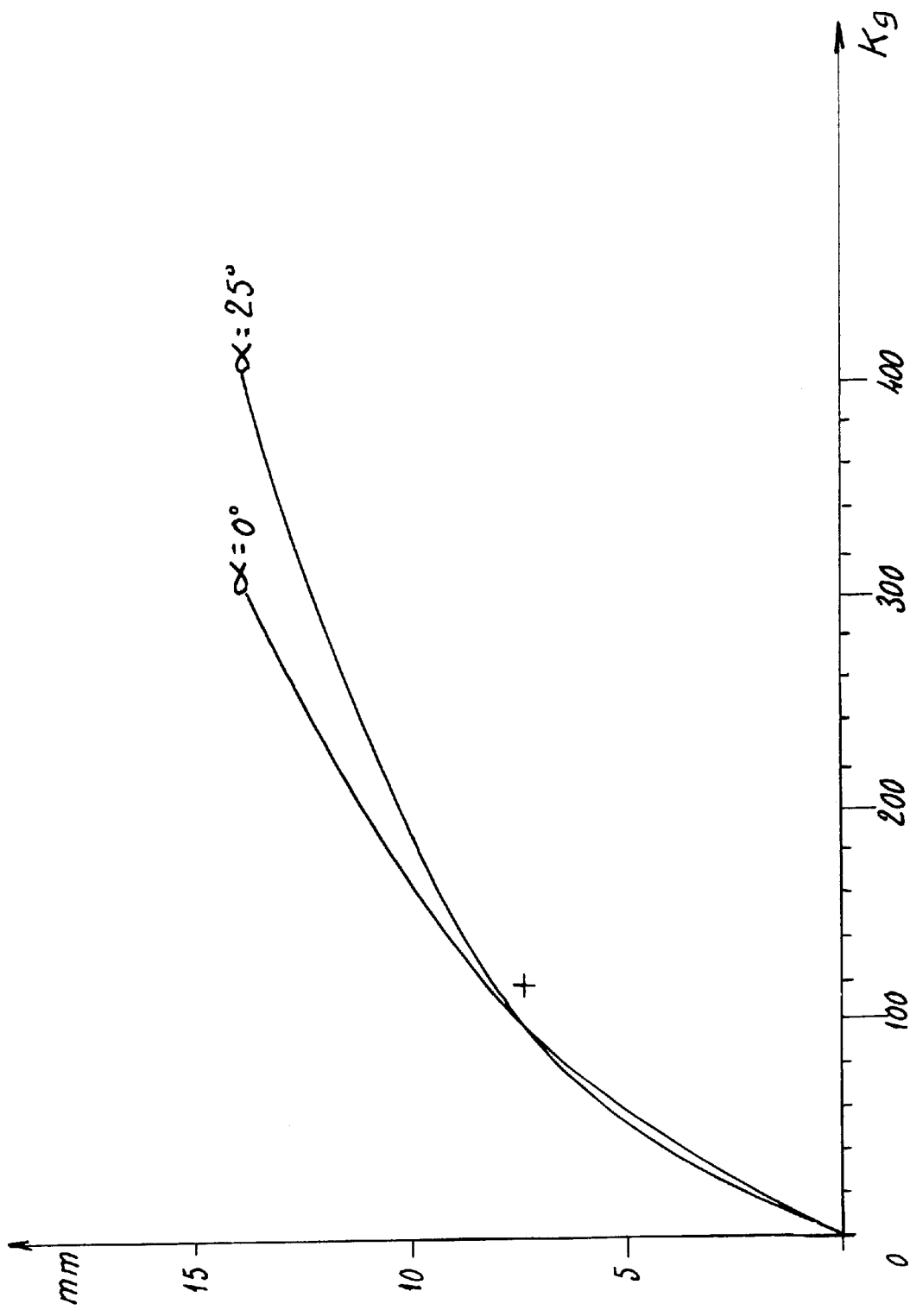

SUSPENDED FRONT FORK FOR MOUNTAIN BIKE AND MOTORCYCLE

TECHNICAL FIELD

The present invention relates to a suspended front fork for a two-wheeled vehicle, and more particularly an all-terrain bicycle and motorcycle.

BACKGROUND OF THE INVENTION

The front fork of such a vehicle has two essential functions:
1. Steering function: it must constantly provide for the steering and stability of the vehicle (bend, straight line, braking, acceleration).
2. Suspension function: this function is needed to ensure comfort, but also to keep the tyre in contact with the ground at all times.

The difficulty in designing such a fork arises in that the second function (suspension) involves a variation in geometry that is not always compatible with the first function (steering).

Such a compromise currently exists with the so-called telescopic fork.

This fork comprises a steering pivot and two tubular, telescopic branches parallel to the steering pivot. The upper parts of these branches are fixed to this pivot by means of two supports in the shape of a T. There is one T at each end of the pivot. Spring/shock-absorber combinations are contained in the two branches to provide the suspension function. The wheel axis is fixed to the lower ends of the two branches.

This type of fork can be found on 99% of motorcycles produced throughout the world and on over 80% of all-terrain bicycles with suspended forks.

Advantages of the telescopic fork:
1. Aesthetic appearance: it is mechanism which is very simple in appearance, the mechanical part being hidden inside the tubes.
2. Low manufacturing costs because of the simplicity of the mechanism.
3. Operation in keeping with the geometry of a two wheeled vehicle: the angle of the fork is such that the forces applied to it on braking or when the wheel passes over an obstacle, are virtually coaxial with the branches of this fork, resulting in low flexion.
4. A geometry which remains constant with the suspension travel, since the offset of the wheel axis with respect to the steering pivot is constant.

At constant attitude (without pitching), the trail rake is therefore constant. The latter only varies with variation in attitude (pitching): dive (depression of the front suspension, raising of the rear suspension) causes its reduction. Conversely, rearing causes its increase. During braking (therefore diving), the mass transfer onto the front makes the steering heavier, which should prevent the cyclist from turning at the same time as he is braking.

As the reduction in trail compensates for the increase in load on the front, the cyclist retains the ability to change direction easily.

Drawbacks of the telescopic fork:
1. Friction.

Plunger pistons must slide in the fork covers without play. There is therefore friction which is all the greater if the arms are subject to flexion forces.

Current motorcycle technology means that the forks are becoming more and more vertical (reduced by 10° in 20 years). The forks are therefore subjected to increasingly large flexion forces. Progress achieved by braking devices is also going in the same negative direction (more flexion force).

For all-terrain bicycles, variations in attitude are so big because of the small wheelbase, that the same problem is encountered, namely a fork which is very vertical under braking, leading to very high flexural stresses. In this context, telescopic forks are functioning increasingly badly.

2. The linearity of the suspension of the telescopic fork.

A front suspension is, much more than a rear suspension, subjected to major variations in load. On a motorcycle, a minimum load of zero kg passes easily to a maximum load of 300 kg. A linear suspension cannot operate correctly with such different loads (too hard for minimum forces and too soft for maximum forces).

3. Stiffness.

Various studies show this weakness. On a motorcycle, the torsional stiffness of a telescopic fork does not reach 6% that of the frame+engine. Its stiffness to longitudinal flexion is below 60%, its stiffness to transverse flexion barely reaches 35%.

4. Geometry.

The trail is determined by the rake angle (angle of the steering column with the vertical), the offset of the wheel axis and the circumference of the tyre. During operation of a telescopic fork, the trail varies according to a single variable, the rake angle (by variation of the attitude), but the amplitude in the variation of the trail with the attitude cannot be controlled.

Other forks:

The lever forks (above all for scooters) are selected because of their small height since they are well suited to small wheels. They have little amplitude, except for the fork known by the name EARLES which provides a large lever arm effect for a greater travel, but has a lot of inertia rotation around the steering pivot.

These levers generally have a push wheel, but there is pull wheel version. Remember that a pull wheel fork means that the arm is located in front of the wheel axis with respect to the direction of travel, the opposite being the case for a push wheel.

Parallelogram forks.

The parallelogram fork is the predecessor of the suspended fork for the motorcycle. Today it has been replaced by the telescopic fork. However, they were both invented at the beginning of the century. Parallelogram forks have disappeared from motorcycles, but several still exist for all-terrain bicycles. They are all of the push-wheel variety. They suffer from a small travel (80/90 millimeters maximum), and their theoretical advantages have not been seen in the field.

SUMMARY OF THE INVENTION

The purpose of the invention is to provide a suspended front fork which eliminates friction, has progressive suspension, has high stiffness with the option of adjusting the geometry and of varying the rake angle, in order to adapt them to the type of vehicle to which they will be fitted.

For this purpose, the fork to which the invention relates, of the type comprising at least one arm at the lower end of which is mounted the wheel axis and whose upper end is associated with the steering pivot, is characterized in that on the steering pivot and in front of the latter is fixed a rigid frame comprising at least one vertical flange, serving as a mount for two horizontal axes, each vertically offset with respect to the other, articulated to the ends of one upper and one lower small connecting rod, whose other ends are articulated to each arm of the fork in the upper third of the length of the arm, an elastic shock-absorbing element having one end fixed on the rigid frame and its other end fixed to one of the upper or lower small connecting rods.

According to one embodiment, rigid frame comprises two horizontal plates, one upper and one lower, fixed respectively to the upper and lower ends of the steering pivot, on the lateral edges of which plates the vertical flanges are fixed.

In a conventional embodiment, this fork comprises two parallel arms connected by a stiffening piece, each connecting rod splitting into two connected branches.

According to one characteristic of the invention, the axis articulating the upper connecting rod to the rigid frame is located between the two plates, while the axis articulating the lower connecting rod to the rigid frame is located below the lower plate.

In order to allow a large amount of travel without disturbing the conditions of use of a vehicle, the branches of the two connecting rods are set apart by a distance greater than the respective widths of the lower plate, the steering pivot and the shock-absorber element, in order to be able to pass on either side of these elements.

The branches of the connecting rods may be located inside or outside the vertical flanges.

According to a first option, the elastic shock-absorber element acts directly on one of the two connecting rods, on a part integral with the connecting rod in question, the axis articulating the shock-absorber to this part being offset with respect to the axis of the connecting rod, so that, in the position of maximum compression, the line passing through the axis articulating the shock-absorber and through the axis articulating the connecting rod in question to the rigid frame, are almost perpendicular to the axis of the shock-absorber.

It is important to note that this arrangement allows the damping effect to be a progressive one.

According to another embodiment of this fork, the lower end of the elastic shock-absorber element is articulated on a lug which is itself pivoted on the rigid frame and on which is pivoted one end of a rod of which the other end is pivoted on the lower connecting rod, the three axes of articulation on the lug being arranged so as to form a triangle in which the axis articulating the lower end of the shock-absorber to the lug is located between the two other axes and below these axes.

BRIEF DESCRIPTION OF THE PREFERRED EMBODIMENT

In any case, the invention will be better understood with the help of the description which follows, with reference to the appended schematic drawings showing several embodiments of this fork:

FIG. 1 is a side view of a first fork, at rest;

FIG. 2 is a front view;

FIGS. 4 to 6 are three views of a second fork with a large travel, corresponding respectively to the views of FIGS. 1 to 3 of the first embodiment;

FIG. 13 shows the elasticity curve of this fork for a motorcycle.

Figure 3:
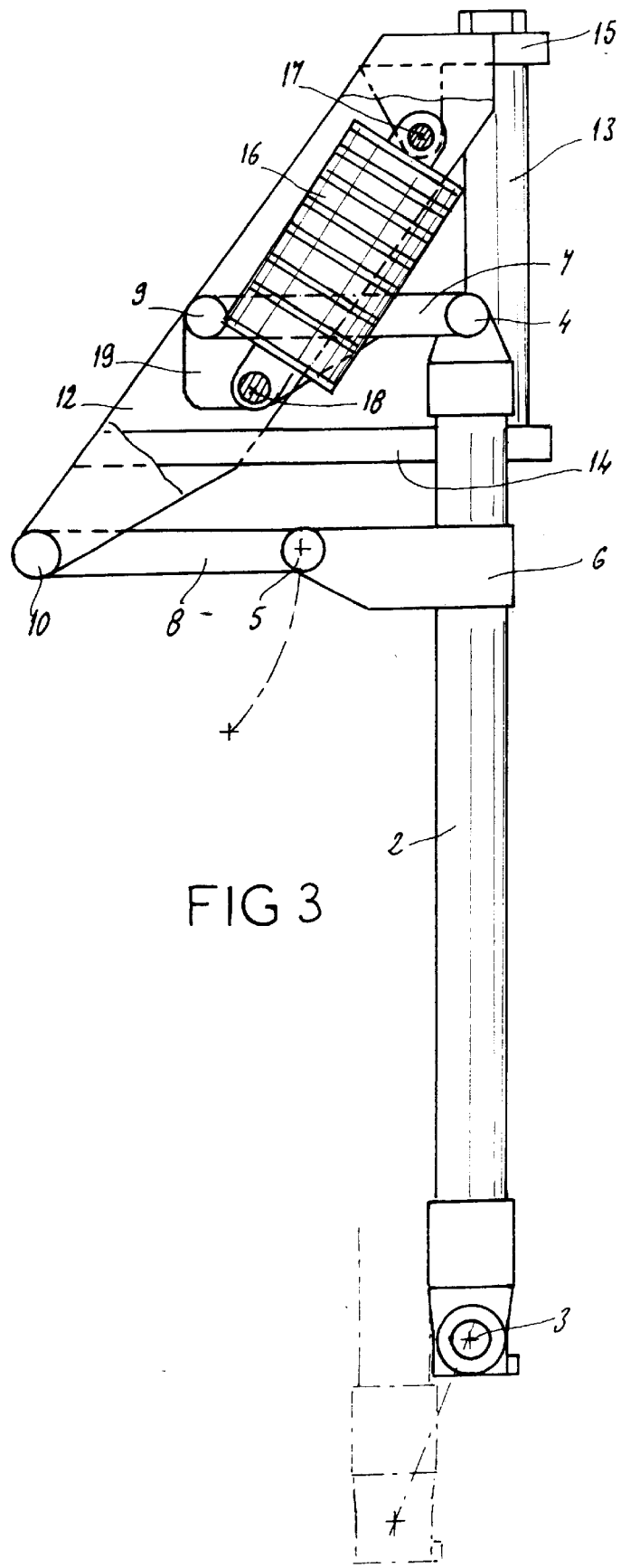
FIG. 3 is a side view thereof, in a position in which the shock-absorber element is compressed.

The fork shown in FIG. 1 comprises two parallel arms 2 having at their lower end a device for fixing the axis of a wheel 3, and at their upper end a connecting rod axis 4.

About 15 to 20 centimeters below this axis 4, this value being a compromise between restrictions and available space, there is a second connecting rod axis 5 and a bridging member 6 connecting the two arms.

Two connecting rods 7 and 8 of the same length are pivoted around horizontal axes 9 and 10 positioned in vertical flanges 12 joined to the steering pivot 13 in front of the pivot via a lower plate 14 fixed to the lower end of the said pivot and via an upper plate 15 fixed to the upper end of the said pivot.

The axes 9 and 10 are superimposed and separated by about 15 to 20 centimeters so that the connecting rods 7, 8 form a suitable angle. The axes 9 and 10 define a plane which is generally parallel to the steering pivot, but this plane may be inclined depending on the difference in length between the connecting rods for example. The other particular feature of these axes 9 and 10 is that they are located in front of the two arms 2. This fork also comprises a spring/shock-absorber combination 16, of which the upper end is articulated at 17 to the upper plate 15, and of which the lower end is articulated at 18 to a part 19 integral with the upper connecting rod. It is worth noting that the point 18 is positioned so that, in the position of maximum compression of the element 16, the line passing through the point 18 and the point 9 is virtually perpendicular to the axis of the shock-absorber element 16.

The two arms 2 do not have telescopic elements, and are therefore perfectly rigid. Advantageously, they are tubular, in a way such that the distance between the axes 4 and 5 can be adjusted by means of sliding collars. They can also be in light alloy, machined or cast, all-welded or even in carbon or similar so as to withstand stresses. For non-tubular arms, the distance between the axes 4 and 5 can be adjusted by cams.

The connecting rods 7 and 8 are made from an aluminium alloy machined in the case of a bicycle, or in an all-welded construction in the case of a motorcycle.

As with all parallelogram forks, the fork according to the invention is stiffer than a telescopic fork and is free of friction. As with a telescopic fork, it has more travel than a parallelogram fork with a push wheel. Unlike these two types of fork, the fork according to the invention has a progressiveness of suspension contained in its operation:

unpressured suspension shown in FIG. 1, the connecting rods 7 and 8 have their axes 9 and 10 of articulation to the flanges 12 located above and in front of the axes 4 and 5 of articulation to the arms. The force applied to the wheel axis, and therefore to the arms, when the wheel passes over an obstacle or during braking, is perpendicular to the connecting rods 7 and 8 and creates a maximum compression couple.

suspension in compression shown on FIG. 3, the connecting rods 7 and 8 carry out a rotation of the order of 90°, their axes 9, 10 of articulation to the flanges are then below and still in front of the axes 4 and 5 for the arms. The connecting rods 7, 8 are therefore parallel to the axis of the force applied, as previously, to the axis of the wheel and to the arms. The compression couple becomes virtually zero. The suspension hardens more quickly than a linear suspension. It is progressive.

In comparison, the parallelogram forks with the push wheel behave in the opposite way: their suspension is regressive.

The fork according to the invention leaves the designer the choice of amplitude of the trail with the variation in attitude: if the connecting rods are parallel (therefore equal) this amplitude depends on the difference between the inclination of the connecting rods with respect to a perpendicular to the steering pivot, suspension uncompressed, and their inclination in maximum compression, these values being taken in absolute terms. The larger this difference, the smaller the variations in trail. It is possible to reduce this amplitude of the trail even further by recourse to connecting rods of unequal lengths, and carefully chosen distances between axes on the flanges and on the arms. This solution becomes necessary for bicycles and motorcycles whose travel goes beyond 170 mm. However, even in this last case, the connecting rods must always describe an angle of the order of 60° to 90° around their axis on the plates for the best size/travel compromise, this angle having to contain the perpendicular to the steering pivot passing through this axis.

Given the amplitude of their rotation, the connecting rods can never be in front of a parallel to the steering pivot passing through their axis on the flanges.

The fork can be adapted to all bicycles and all motorcycles: height, trail, suspension characteristics (the spring/shock-absorber combination is independent of the fork and can be selected from the range of manufacturers, with a spring or pneumatic element) are adaptable to every case.

Figure 6:
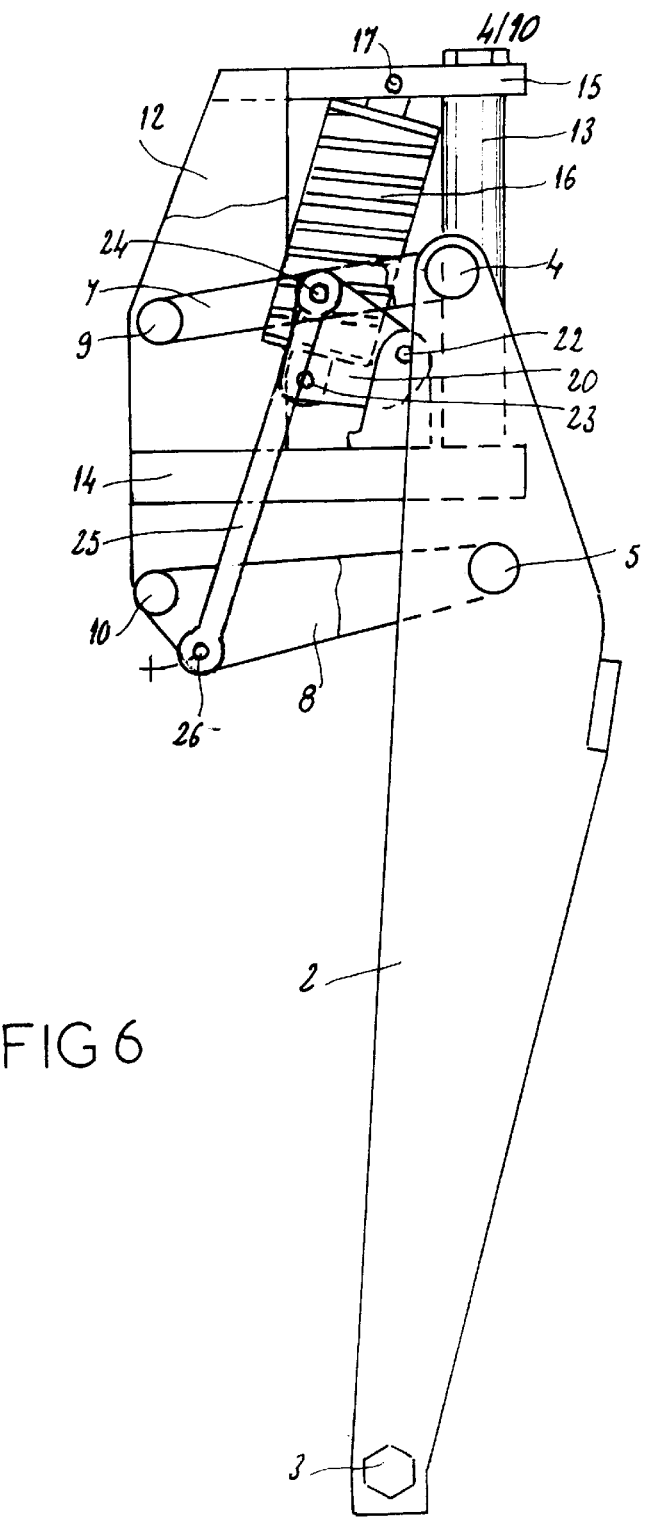
Figure 6:

FIGS. 4 to 6, in which the same elements are denoted by the same references as previously, show a downhill all-terrain bicycle fork with a very large travel (220 mm) with connecting rods 7, 8 of unequal lengths in order to have a very small variation in trail. The fork has a compression rod device inserted between the lower connecting rod 8 and the shock-absorber 16 designed to increase the progressive nature of the suspension.

For this purpose, a lug 20 is articulated around an axis 22 on the lower plate 14. On this lug is also articulated, at 23, the lower end of the shock-absorber element 16, and, at 24, the upper end of a rod 25 whose other end is articulated, at 26, on the lower connecting rod 8. As shown in the drawing, the three axes of articulation 22, 23 and 24 form a triangle, the axis 23 for mounting of the lower end of the shock-absorber being located between the two other axes and below them.

The connecting rods, machined in aluminium, may be articulated on needle bearings or on self-lubricating bushings. This latter solution has been preferred here for reasons of volume and load capacity.

Variation in geometry.

Compared to a downhill telescopic fork of 145 mm travel (to date, none of 220 mm exist) mounted on a bicycle of 1050 mm wheelbase and having a rear suspension with about 200 mm of travel, the extreme variations in trail are:
for maximum dive:
common telescopic fork: 20 millimeters
new fork: 60 millimeters
for minimum rearing:
telescopic fork: 150 millimeters
new fork: 90 millimeters.

That is 130 mm of amplitude for the telescopic fork and only 30 millimeters for the fork according to the invention, in spite of a much higher travel on the latter (220 millimeters instead of 145).

The axis 5 can be moved on the arms 2 by a system of cams which, as required, modify this variation of trail (vertical adjustment) and also the average value of this trail (horizontal adjustment).

The advantage of this fork is therefore that of maintaining good stability of the vehicle on braking (maximum dive) in spite of a very large suspension travel, the 20 millimeters of trail obtained with the telescopic fork making the bicycle unridable.

Conversely, a trail of 150 millimeters for rearing up, obtained with the same telescopic fork prevents the rider from changing direction when going fast. The invention avoids these two extremes.

Figure 7:
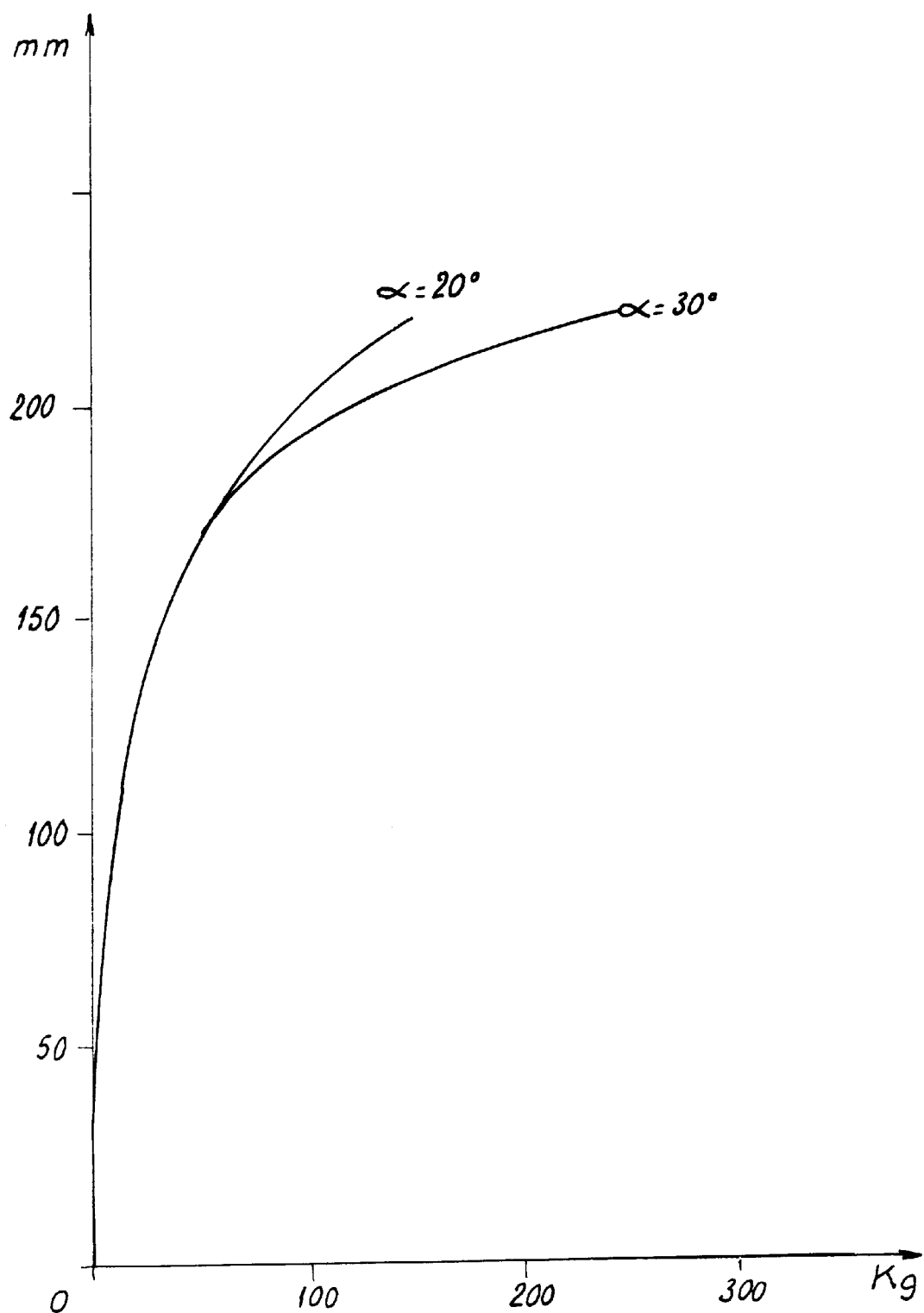
FIG. 7 is an elasticity curve for the fork of FIGS. 4 to 6.

Suspension progressively:

FIG. 7 gives the elasticity curves of the downhill fork for a spring rating of 75 N/mm while taking account of the angle α made by the force applied to the wheel axis with the direction of the fork pivot. These curves show that the extreme progressively of the downhill fork enables a reconciliation which is impossible with a linear suspension;
at the start of travel, a compression force of 5 kg causes a depression of 50 mm, i.e. a very soft suspension;
at the end of travel, the same 5 kg force then only causes a compression of 2 mm. An increase in α is seen to reduce this compression even further. Now, α increases with the intensity of braking. This therefore means that the fork has in its operation an anti-dive effect.

Figure 8:
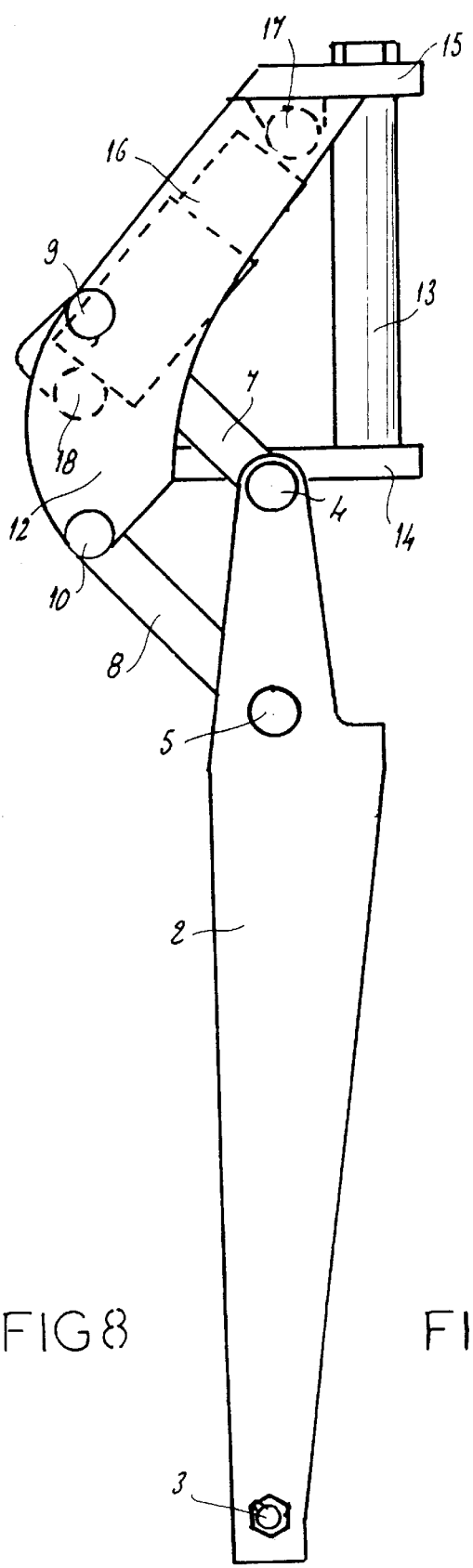
FIGS. 8 and 9 are two views respectively of the side and the front of a multipurpose all-terrain bicycle fork.
Figure 9:
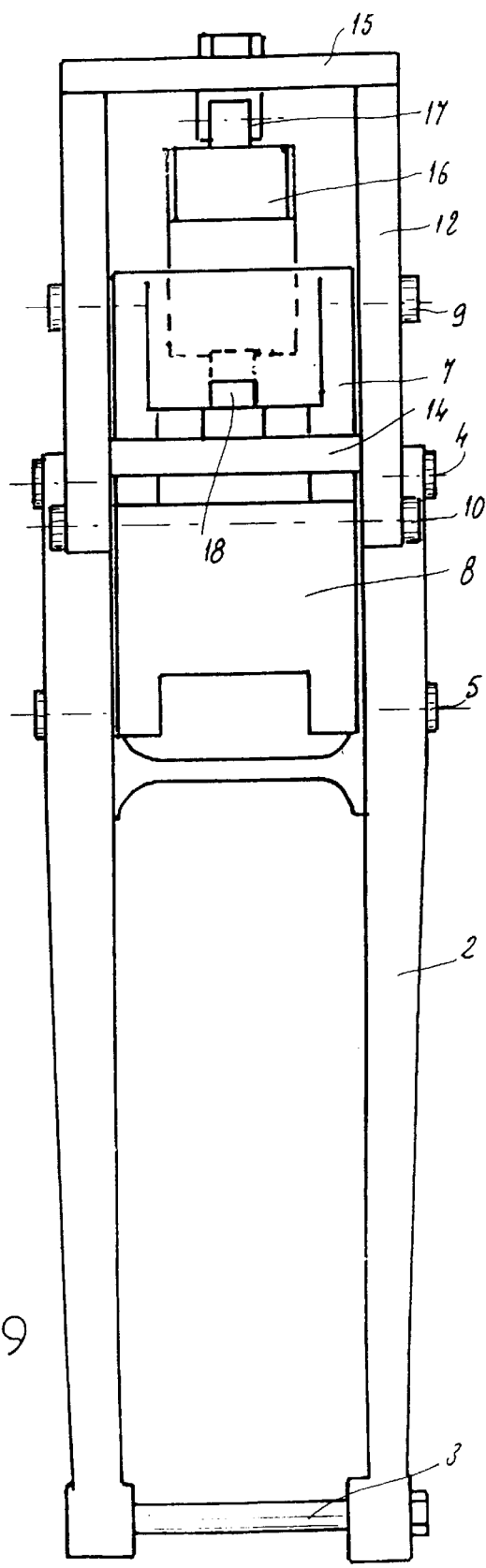

FIGS. 8 and 9, in which the same elements are denoted by the same references as previously, shows a multipurpose all-terrain bicycle fork. The travel is 135 mm. The variations in attitude being smaller with 135 mm than in the previous case (downhill) with 220 mm, this will lead to a smaller variation in trail. For this reason, the connecting rods 7, 8 are parallel and of equal length. There is no thrust rod 25 between the connecting rod and the shock-absorber, since the "natural" progressively of this fork is enough for a travel of 135 mm. The shock-absorber 16 is actuated by the upper connecting rod 7.

In this case an oil and pneumatics combination is advantageously used rather than a spring/shock-absorber combination.

Geometry variation.

By taking the same basis of comparison as for the downhill bicycle fork (same bicycle, same reference fork), the extreme variations in trail are as follows:
for maximum dive:
telescopic fork: 20 millimeters
new fork: 50 millimeters
for maximum rearing:
telescopic fork: 150 millimeters
new fork: 140 millimeters.

That is 130 millimeters of amplitude for the trail of the telescopic fork, and 90 millimeters for the new fork.

Because of the progressive suspension, it is difficult for the new fork to encounter a situation of maximum rearing effect, having a lot of negative travel (compression resulting from just the weight of the bike+rider). Adjustment for the position of the axes 4 and 5 is not provided for, the connecting rods having to remain parallel.

Progressivity of suspension

Figure 10:
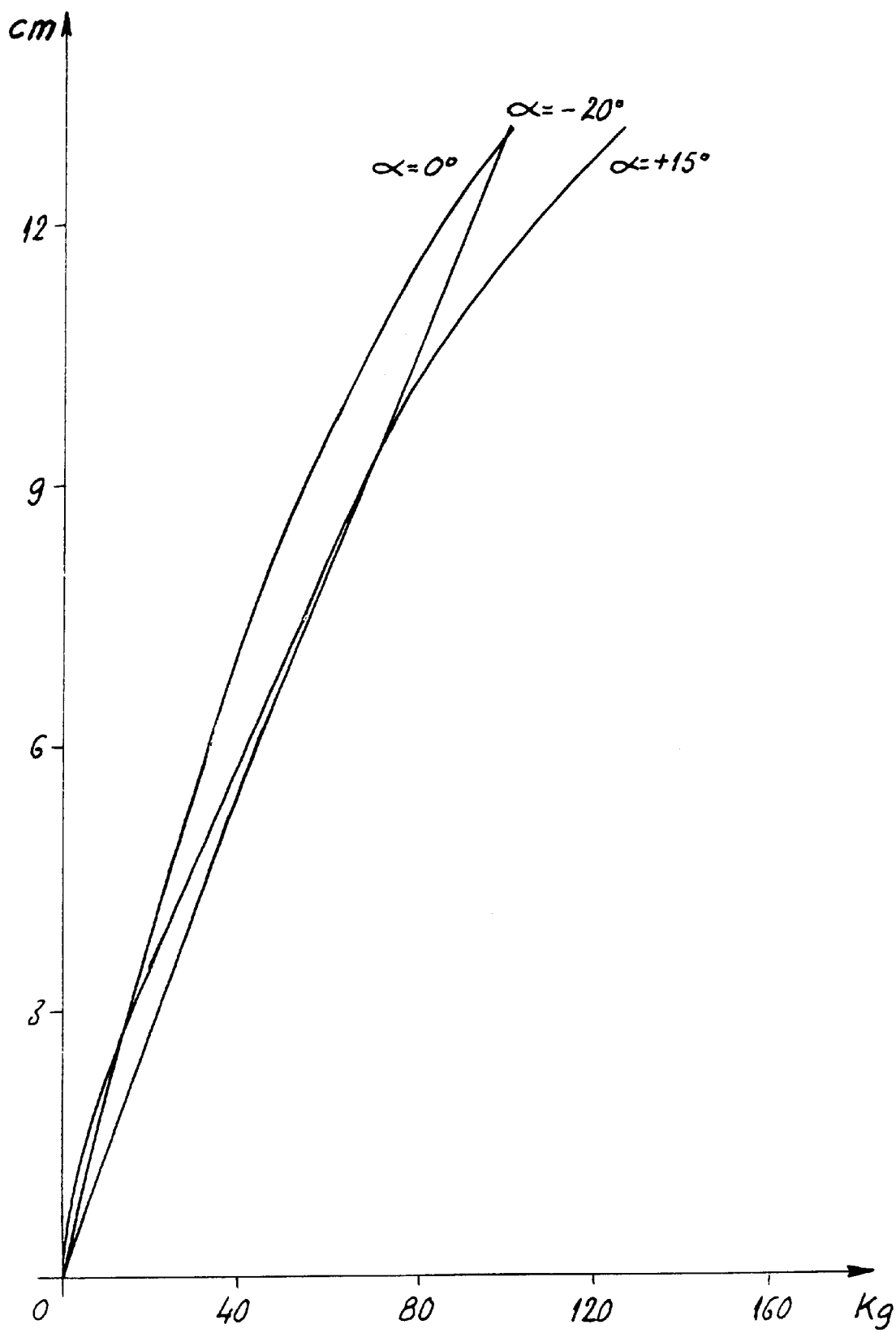
FIG. 10 shows the elasticity curve of this multipurpose fork.

FIG. 10 gives the elasticity curves for this multipurpose all-terrain bicycle fork with a spring rating of 75 N/mm taking account of the angle α made by the force applied to the wheel axis with the direction of the fork pivot. The curve α=−20° corresponds to vertical forces: the weight of the bicycle+rider on the front wheel axis, as well as the up-and-down forces caused by pedalling. This curve is a straight line (linear function). Up and down variations caused by pedalling will make the load on the front vary by around 20 kg (between 30 and 50 kg for example) this represents a travel of 25 millimeters, which is reduced by the shock-absorber forces. The amplitude remains within an acceptable range. The curve $\alpha=+15°$ corresponds to the forces caused by braking and crossing large sized obstacles. The curve $\alpha=0°$ corresponds to crossing small sized obstacles. The divergence of these two curves towards the top shows an anti-dive effect of the new fork, limiting the variations in attitude (pitching). The curve $\alpha=+15°$ shows a very large progressivity: 5 kg causes a depression of 15 millimeters at the start of travel, 5 kilograms causing a depression of 5 millimeters at the end of travel. This virtually prevents bottoming-out on major obstacles or on sharp application of the brakes. This new fork therefore has an advantage of geometry and progressivity with respect to a telescopic fork.

Figure 11:
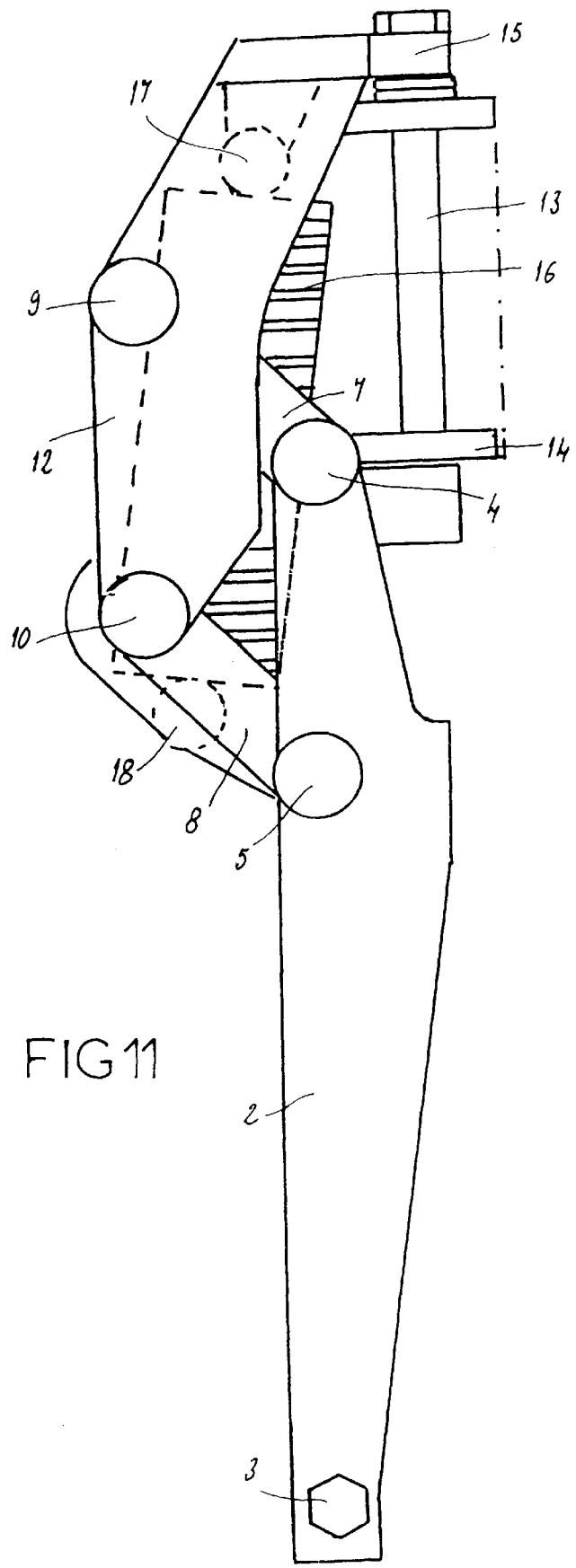
FIGS. 11 and 12 are views of the side and of the front, respectively, of a fork for a road-going motorcycle of high cylinder capacity.
Figure 12:
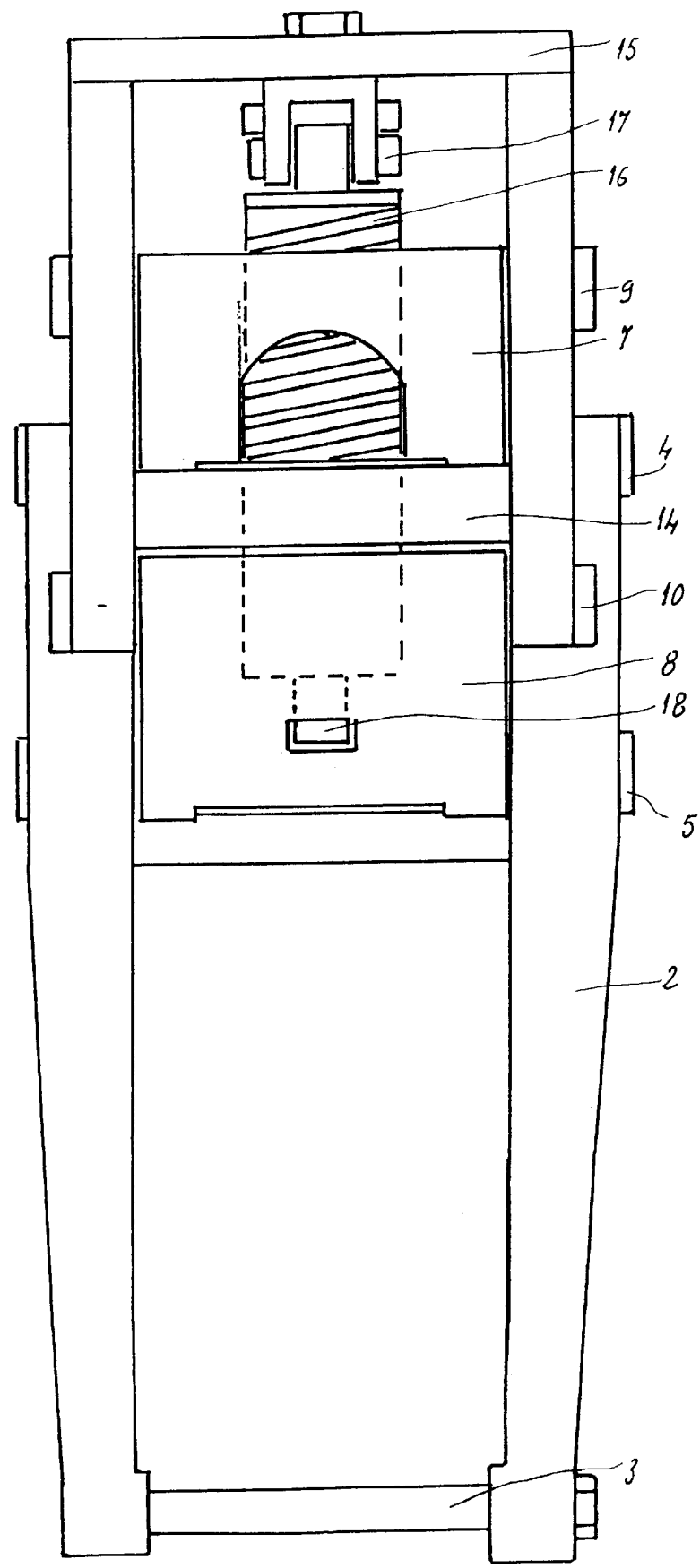

FIGS. 11 and 12, in which the same elements are denoted by the same references as previously, show a fork for a road-going motorcycle of large cylinder capacity (750 cm$^2$ to be exact). Its travel is 135 mm, the connecting rods 7, 8 are parallel and are the same length since, because of the small amplitudes of the suspension, the variations in attitude are small. The spring/shock-absorber combinations 16 of motorcycles being much longer than those of bicycles, it is the lower connecting rod 8 which compresses that of this fork. The arms 2 are in light alloy machined with a stiffening bridging member at the level of the lower connecting rod axes, joining the two arms. The articulations consist of rolling bearings containing needles.

Variation in geometry.

The problems raised by the telescopic fork in the behaviour of a road-going motorcycle are not the same as those concerning an all-terrain bicycle.

It is difficult to reconcile ease of handling when entering a bend and stability at high speed in a motorcycle, since there is either too much trail for tilting, or not enough when going in a straight line. As the attitude of a motorcycle does not vary much, the amplitude of the trail is not enough, which is the converse of the case of the all-terrain bike.

The rearing-up on coming out of a bend under the effect of accelerating again, increases the trail far too much, causing the rider to understeer.

Compared to a telescopic fork of 120 millimeters' travel, mounted on a sports motorcycle of 1400 millimeters' wheelbase and 130 millimeters' travel on the rear suspension, the new fork has the following variations in trail:

for maximum dive:
  telescopic fork: 85 millimeters
  new fork: 85 millimeters
stationary:
  telescopic fork: 104 millimeters
  new fork: 110 millimeters
for maximum rearing:
  telescopic fork: 133 millimeters
  new fork: 103 millimeters.

For equal ease of handling when entering a bend (maximum dive), the new fork therefore gives more stability in a straight line (110 mm instead of 104 mm of trail), and above all a much greater ability to come out of bends since the trail is reduced (103 millimeters instead of the 133 millimeters of the telescopic fork).

b. Progressivity of suspension:

FIG. 13 shows the elasticity curves of the new motorcycle fork for $\alpha=0°$ and $\alpha=25°$ with a spring rating of 110 N/mm. The first corresponds to the forces caused by passing over small unevennesses, most often encountered on the road. The curve $\alpha=25°$ corresponds to the forces caused by sudden braking, forces with an angle of 45° with respect to the vertical reduced by the 20° of inclination of the steering pivot. The isolated point on the graph corresponds to the depression of the suspension under the effect only of the combined weight of motorcycle+rider (motorcycle weighing 200 kg inclusive of all requisite fluids and a 70 kg rider). The position of this point shows a considerable negative travel, enabling the suspension to operate even when the front of the motorcycle is strongly unloaded by its accelerations. In particular, it is observed that even a pressure of 10 kg already creates a depression of 10 mm. A telescopic fork always operates with preload. This preload to which the friction forces are added means that a pressure of 4 to 5 times greater is needed to start compression. This absence of operation of the telescopic fork over bumps in case of significant removal of pressure is the underlying cause of a very dangerous phenomenon in motorcycles: front wheel weaving. This phenomenon is suppressed with the new fork. The curve $\alpha=0$ is more upright than the curve $\alpha=25°$. This means that the fork is softer on oscillations resulting from small unevennesses than from reactions to violent braking. This means that the small unevennesses are always well absorbed but that the very high forces caused by braking cannot cause it to bottom out.

A telescopic fork has a travel which is limited, among other things, for reasons of geometry covered in the previous paragraph. This means that it is always prestressed and nevertheless that it is always at the limit of bottoming out under braking. This does not prevent it having a coefficient of elasticity which is very much lower, (harder suspension), its linear suspension not being able to reconcile the extremes.

This very progressive new fork, reacting more gently to small unevennesses than to violent braking, capable of reacting to load variations of less than 10 kg, has proved to be very much superior in operation to a telescopic fork.

The diversity of the applications presented here shows that any suspended two-wheeled vehicle can take advantage from using this invention. Only the case of the all-terrain motorcycle has not been covered, but it is comparable to the case of the downhill bicycle in terms of the travel required (250 to 300 millimeters). It is therefore possible to replace any telescopic fork with the fork according to the invention without modification of their general design. The only restriction: the fairings, headlights and dashboard of the motorcycles must be converted to accommodate it, but these modifications do not lead to any aesthetic disruption. Very pointed fairings (in an aerodynamic search for downforce) easily hide the front prominence of this new fork. New complex-surface lights also save a great deal of space inside the fairings facilitating the fitting of this new fork. While this invention can be adapted to suit all vehicles, it is also very interesting to design the vehicles specifically to receive this new fork. In particular it is advantageous to use smaller rake angles, the current angles not being justified only by the concern to ensure the proper operation of telescopic forks. This reduction in the rake angle allows smaller variations in trail and therefore allows use of the version of the invention with parallel connecting rods in all cases.

As goes without saying, the invention is not limited only to the embodiments of this fork described hereinabove by way of examples; on the contrary it covers all variants thereof. Thus, in particular, the fork could comprise only one arm, the rigid frame may be different and may comprise for example only one lower plate and one vertical flange, without in any way deviating from the framework of the invention.

What is claimed is:

1. Suspended front fork for a two-wheeled vehicle, the fork comprising:

at least one arm having a lower end and an upper end;

a wheel axis mounted to the lower end of the arm;

a steering pivot associated with the upper end of the arm;

a frame fixed to the steering pivot and located in front of the steering pivot, the frame comprising: at least one vertical flange serving as a mount for two horizontal axes, the two horizontal axes are disposed parallel to the wheel axis and the each horizontal axis is vertically offset with respect to the other; an upper and a lower connecting rod, wherein the vertical flange is articulated to first ends of the upper and lower connecting rods, the arm is articulated to second ends of the upper and lower connecting rods, the second ends of the connecting rods disposed at an upper third of a length of the arm, the horizontal axes that articulate the connecting rods to the vertical flange are located in front of connecting rod axes, the connecting rod axes articulating the connecting rods to the arm; and an elastic shock-absorbing element, working in compression, having a first end fixed on the frame and a second end fixed to one of the upper or lower connecting rods, wherein the frame comprises a two horizontal plates, one upper and one lower, fixed to the steering pivot, the lower plate being located at the level of the lower end of the steering pivot, the vertical flanges being fixed to the lateral edges of the plates wherein the connecting rod axes include a first connecting rod axis articulating the upper connecting rod and a second connecting rod axis articulating the lower connecting rod, the first connecting rod axis is located between the two plates, the second connecting rod axis is located below the lower plate.

2. Fork according to claim 1, wherein the at least one arm comprises two parallel arms connected by a stiffening piece, each connecting rod splitting into two connected branches.

3. Fork according to claim 2, wherein the branches of the two connecting rods are set apart by a distance greater than respective widths of the lower plate, the steering pivot and the shock-absorber element, in order to be able to pass on either side of these elements.

4. Fork according to claim 2, wherein the branches of the connecting rods are located inside the vertical flange.

5. Fork according to claim 2, wherein the branches of the connecting rods are located outside the vertical flange.

6. Fork according to claim 1, wherein the elastic shock-absorber clement acts on one of the two connecting rods, by means of a part integral with the connecting rod in question, an absorber axis articulating the shock-absorber clement to this part being offset with respect to one of the connecting rod axis, so that, in a position of maximum compression of the shock-absorber element, a line passing through the absorber axis and through the one of the connecting rod axis are almost perpendicular to the absorber axis.

7. Suspended front fork for a two-wheeled vehicle, the fork comprising:

at least one arm having a lower end and an upper end;

a wheel axis mounted to the lower end of the arm;

a steering pivot associated with the upper end of the arm;

a frame fixed to the steering pivot and located in front of the steering pivot, the frame comprising: at least one vertical flange serving as a mount for two horizontal axes, the two horizontal axes are disposed parallel to the wheel axis and the each horizontal axis is vertically offset with respect to the other; an upper and a lower connecting rod, wherein the vertical flange is articulated to first ends of the upper and lower connecting rods, the arm is articulated to second ends of the upper and lower connecting rods, the second ends of the connecting rods disposed at an upper third of a length of the arm, the horizontal axes that articulate the connecting rods to the vertical flange are located in front of connecting rod axes, the connecting rod axes articulating the connecting rods to the arm; and an elastic shock-absorbing element, working in compression, having a first end fixed on the frame and a second end fixed to one of the upper or lower connecting rods, wherein the frame comprises a two horizontal plates, one upper and one lower, fixed to the steering pivot, the lower plate being located at the level of the lower end of the steering pivot, the vertical flanges being fixed to the lateral edges of the plates, wherein the second end of the elastic shock-absorber element is articulated on a lug which is itself pivoted on the frame and on which is pivoted one end of a rod of which the other end is pivoted on the lower horizontal plate, three axes of articulation on the lug being arranged so as to form a triangle in which the axis articulating the second end of the shock-absorber to the lug is located between the two other axes and below these axes.

* * * * *